G. F. ECKART.
STRIPPER MECHANISM FOR TOBACCO STEMMING MACHINES.
APPLICATION FILED DEC. 9, 1912.
1,110,426.
Patented Sept. 15, 1914.
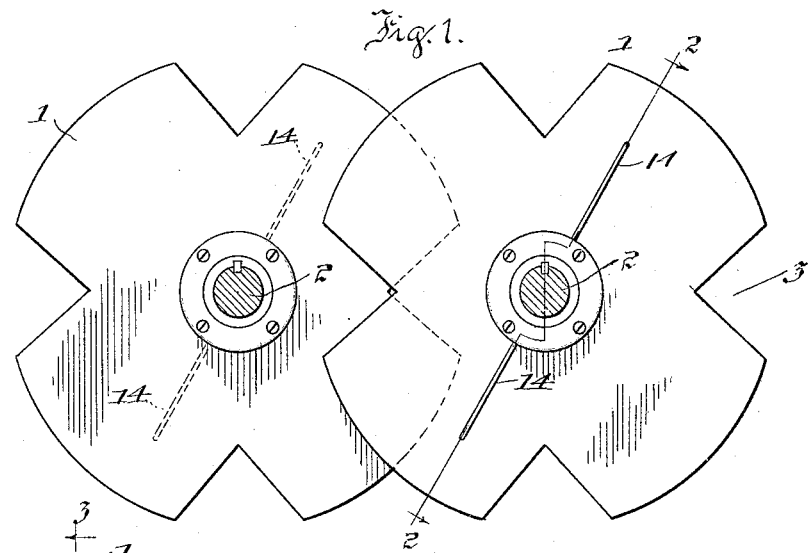
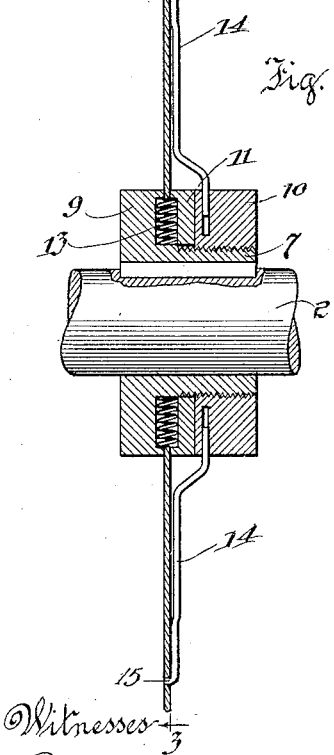
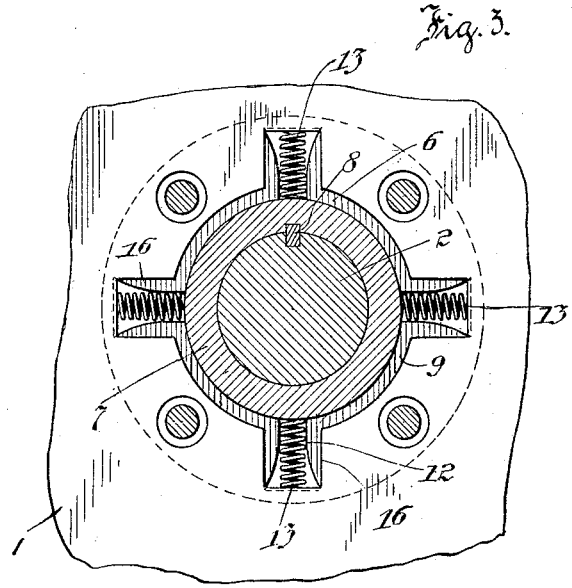
Witnesses
Robert H Weir
Arthur Carlson
Inventor
George F. Eckart,
By Rudolph
Atty.

UNITED STATES PATENT OFFICE.

GEORGE F. ECKART, OF CHICAGO, ILLINOIS, ASSIGNOR TO AUTOMATIC STEMMER COMPANY, OF CHICAGO, ILLINOIS, A CORPORATION OF DELAWARE.

STRIPPER MECHANISM FOR TOBACCO-STEMMING MACHINES.

1,110,426.     Specification of Letters Patent.     Patented Sept. 15, 1914.

Application filed December 9, 1912. Serial No. 735,727.

*To all whom it may concern:*

Be it known that I, GEORGE F. ECKART, citizen of the United States, residing at Chicago, in the county of Cook and State of Illinois, have invented certain new and useful Improvements in Stripper Mechanism for Tobacco-Stemming Machines; and I do hereby declare the following to be a full, clear, and exact description of the invention, such as will enable others skilled in the art to which it appertains to make and use the same.

My invention relates to machines for stripping leaves off their stems, and more particularly to tobacco stemming machines having rotating stripper disks provided with notches affording spaces therebetween for the stems of the leaves from which the laminæ are being stripped. Such machines are fully illustrated and described in Letters Patent No. 1032192 and 1004506, granted to me July 9, 1912 and November 19, 1912, respectively. In each of these patents I have shown a machine having a pair of constantly rotating stripper disks provided with peripheral recesses which will coöperate, when the disks are in certain position, to form openings through which the stems and midribs may freely be slid while the leaves are being stripped from them. In operating stripping mechanisms on this principle, provision must be made for automatically adapting the mechanism to variations in the sizes and shapes of the stems, or to the corresponding variations in form and thickness resulting from the simultaneous feeding of two or more stems through the stem-passing opening. In my issued Patent No. 1004506 already referred to, Figures —14— and —15— show a suitable method of mounting the stripper disks whereby they may make these needed adjustments to the size and contour of the stem or stems which are being fed through the machine. In operating stripping machines provided with self-adjusting stripper disks arranged in the manner thus disclosed, I have found that the flexible mounting of the disks interferes with their being driven with sufficient firmness to insure a suitable alignment of the notches which coöperate to form the stem-passing openings. Consequently, the stems are apt to catch between the improperly aligned notches, thereby interfering with the rapid, continuous and economical operation of the stripping machines.

The object of my present invention is to provide guides which will maintain each of the stripper disks in a substantially fixed relation circumferentially with respect to its shaft, whereby a proper alinement of the notched portions of the said disks may readily be secured, while still permitting these coöperating disks to adjust themselves radially of the shafts upon which they are mounted, so as to allow for variations in the stems and mid ribs of the leaves fed through the machine.

I accomplish this object by the construction shown in the accompanying drawings, in which—

Fig. —1— is a plan view of a pair of coöperating stripper disks mounted upon a shaft equipped with the auxiliary guides of my invention. Fig. —2— is an enlarged side section through Fig. —1— along the line E—E. Fig. —3— is an enlarged fragmentary detail view of the central portion of one of the disks, partly in section.

In the drawings, the partly overlapping stripper disks 1 are mounted upon shafts 2 which shafts are continuously rotated in opposite directions when the machine is in operation. Each of the disks is provided with peripheral notches 3 spaced at uniform intervals so that these notches will coöperate when passing the line 4—4 connecting the centers of the disks, to form a comparatively small opening 5, through which opening the midrib or stem of the leaf may be drawn in a direction parallel to the shafts 2, whereby the sharp edges of the notches 3 will strip or shear the laminæ of the leaf from the said midrib or stem.

If the stems or midribs of the leaves which are to be stripped were all uniform in size and sectional configuration, and if there were no back-lash or lost motion in the mechanism actuating the stripper disks, the stripper disks 1 could be secured rigidly to the shafts 2. However, the size and shape of the stems vary considerably in practice and this variation is further augmented occasionally when two or more leaves are fed simultaneously or overlappingly through the machine. Moreover, the lost motion attributable to the gradual wear on various parts of the mechanism, together with any flexing or distortion of the parts due to strains upon the same, would make it impossible in practice to secure an effective closure around the stem or midrib of the leaf between the notched portions of the disks if these were rigidly secured to their respective shafts. I, therefore, permit each disk to have a limited motion both radially and circumferentially with respect to the shaft carrying the same, this being preferably accomplished by the construction shown in Figs. —2— and —3—. In this construction, the disk 1 has a central bore 6 considerably larger than the outside diameter of an externally threaded sleeve 7, which sleeve is fastened non-rotatably to the shaft 2 by a key 8. The sleeve 7 is enlarged at one end to form a flange 9, while a collar 10 is screwed upon the threaded portion of the sleeve 7. Between the flange 9 and the collar 10, I clamp a ring 11, which ring is narrowed adjacent to its periphery so as to provide an outer annular passage between flange 9 and ring 10, slightly wider than the thickness of the disk 1, whereby the disk 1 will be free to slide between the said flange and ring. Upon the adjacent surfaces of the flange 9 and ring 11, I provide radially disposed recesses 12 adapted to aline with one another and extending outwardly to the said narrowed portion of the ring 10. Each of these recesses is of a suitable diameter at a point midway of their radial length to readily house a spiral spring 13 radially disposed within the same, but is flared in diameter peripherally of the ring and flange at each end, whereby the spring is enabled to move somewhat out of its normally radial position. This movement of the spring will permit the disk 1 against which the spring bears at its outer end, to move circumferentially with respect to the hub of the wheel bearing the disk; but the flexing of the spring about the narrowed central portion of the coöperating recess portions will cause it to return to its radial position upon cessation of the strain which caused the flexing. Thus the springs 13, of which there are preferably four, will tend to keep the disk 1 not only concentric with the shaft 2, but also in a fixed position circumferentially of the shaft, whereby the notches 3 are maintained in their coöperating relations during the operation of the machine. In practice, I have found, however, that the flaring of the grooves or recesses in which the springs are housed will permit the latter to oscillate from their normal radial positions, so that it is difficult to maintain the desired circumferential alinement of the notches in the disks when leaves having stems or midribs of greatly varying sizes are successively fed through such a stripping machine. Consequently, the leaves are apt to be damaged and the edges of the notches may catch on the stems, thereby interfering with the rapid operation of the machine. To obviate this difficulty, I provide auxiliary guide members 14, each being preferably in the form of a radially disposed rod of heavy spring steel wire having its outer end 15 bent parallel to the shaft and inserted in a perforation near the outer edge of the disk, while its inner end is free to slide in a radial perforation 16 in the collar 10. Being thus slidably mounted in the collar 10, the guide 14 will freely permit a radial motion of the disk 1, as such motion will place no strain upon the guide. However, any circumferential movement of the disk relative to the collar 10 (and hence with respect to the sleeve 7 and shaft 2 to which the collar is non-rotatably fastened) will flex the guide 14, and the resiliency of this guide will return the disk to its former position upon cessation of the strain producing the aforesaid circumferential movement of the disk. By varying the diameter of the guide rods 14, or the material of which they are made, the resistance offered by these guide rods to a circumferential motion of the disk relatively to the rotating member carrying the same, may be made as powerful as desired without altering the stiffness or resiliency of the springs 13. Indeed, by making the recesses 12 wide enough circumferentially to fit the springs 13 rather loosely at all points of their length (as shown by dotted lines 15 in Fig. —3—) the radial alining may be done entirely by the guides 14, leaving the springs 13 only to maintain the desired concentric relation between the shaft 2 and the disk 1.

While I have shown and described my invention in a certain embodiment, I do not wish to be limited to the exact details which I have pictured or mentioned, it being obvious that numerous modifications may be made in the same without departing from the spirit of my invention. For example, the number of radial guides engaging each disk may be varied if desired, as also of the springs interposed between each disk and the rotating member carrying the same. So also the guides which restrict the motion of each disk may be made of other resilient materials than spring steel.

I claim as my invention:

1. In a machine of the class described, the combination with a pair of shafts rotatable in opposite directions, of a pair of coacting peripherally notched stripper disks mounted upon said respective shafts, each disk being movable both radially and circumferentially with respect to the shaft upon which it is mounted; a plurality of spring members adapted to hold each disk concentric with its shaft; and guiding means for restricting the motion of each disk with respect to its shaft to a substantially radial movement.

2. In a machine of the class described, the combination of a pair of oppositely rotatable members, a pair of disks carried by the same having coacting peripheral recesses, spring members tending to maintain the disks concentric with their respective carrying members, and a guide for restricting the motion of each disk with respect to its carrying member; the said guide being secured at one end to one of said parts and having slidable engagement at its other end with the other part.

3. A machine of the class described, including a pair of oppositely rotatable shafts, a pair of disks having coacting peripheral recesses carried thereby, a plurality of springs interposed between each disk and its shaft, and tending to maintain said parts concentric, and flexible members engaged with said respective parts for yieldingly resisting relative rotary movement thereof.

4. A machine of the class described, including a pair of oppositely rotatable shafts, a pair of disks having coacting peripheral recesses carried by said shafts, a plurality of springs interposed between said members for maintaining the same concentric, and a plurality of flexible members slidably engaged with one of said parts and secured to the other thereof for resisting relative rotary movement thereof.

5. In a machine of the class described, the combination of a pair of oppositely rotatable members, a disk carried by each, said disks having coacting peripheral recesses, spring members tending to maintain each disk concentric with its carrying member, and a plurality of flexible members each having radially slidable engagement with one of said parts and secured to the other thereof for resisting relative rotary movement of each disk and its carrying member.

6. In a machine of the class described, the combination of a pair of oppositely rotatable members, a disk carried by each thereof, said disk having coacting peripheral recesses, spring members for maintaining each disk concentric with its carrying member, and a guide of resilient material for restricting the motion of each disk with respect to its carrying member; each guide being secured at one end to a said disk and having slidable engagement at its other end with the rotatable member carrying said disk.

7. A machine of the class described, including a pair of oppositely rotatable shafts, a pair of disks having coacting peripheral recesses mounted thereon, and movable radially and rotatably relatively thereto, a plurality of springs interposed between each disk and its carrying member for maintaining the same concentric, and flexible guiding members each secured to one of said disks, and having radially slidable engagement with the carrying member for said disk.

8. A machine of the class described, including a pair of oppositely rotatable shafts, a pair of disks having coacting peripheral recesses mounted thereon; a plurality of springs interposed between each disk and its carrying member for maintaining the same concentric, hub members on each of said shafts between which its disk is guided, and a plurality of flexible rods each secured at one end to a disk, and having radially slidable engagement with one of said hub members, for the purpose set forth.

9. In a tobacco stemming machine, a pair of oppositely rotatable shafts, a pair of coacting stripper disks carried thereby, a hub on each shaft having an annular flange, a member mounted on each hub opposing said flange, each disk disposed between and guided by said member and said flange and movable radially and rotatable of said hub, a plurality of radially disposed springs mounted in recesses in the opposed faces of said flange and said member and engaging in radial recesses in said disk for maintaining the latter concentric with said hub, and a plurality of flexible rods each engaging at one end in an opening in said disk and at its other end and slidably engaged with said hub as and for the purpose specified.

10. In a tobacco stemming machine, a pair of oppositely rotatable shafts, a pair of coacting stripper disks carried thereby, a hub on each shaft having an annular flange, a member mounted on each hub opposing said flange, in the opposed faces of said flange and said member and engaging in radial recesses in said disk for maintaining the latter concentric with said hub, and a plurality of flexible rods each engaging at one end in an opening in said disk and at its other end slidably engaged with said hub as and for the purpose specified.

11. In a tobacco stemming machine, a pair of oppositely rotatable shafts, a pair of stripper disks having coacting peripheral recesses loosely mounted on said respective shafts, means on the latter for preventing movement of said disks longitudinally thereof and affording guides between which said disks are radially and rotatably movable relatively thereto, elastic devices engaged with each disk and said means on its carrying shaft for yieldingly resisting relative rotary movement thereof, and yielding means interposed between each disk and its carrying means for maintaining the same concentric.

In testimony whereof I have signed my name in presence of two subscribing witnesses.

GEORGE F. ECKART.

Witnesses:
ELMER BRADER,
E. BENTLEY HAMILTON.

Copies of this patent may be obtained for five cents each, by addressing the "Commissioner of Patents, Washington, D. C."